(12) United States Patent
Matsuda et al.

(10) Patent No.: US 8,094,233 B2
(45) Date of Patent: Jan. 10, 2012

(54) IMAGING DEVICE FOR A CAMERA

(75) Inventors: Hideaki Matsuda, Osaka (JP); Hisao Kobayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 330 days.

(21) Appl. No.: 12/420,284

(22) Filed: Apr. 8, 2009

(65) Prior Publication Data

US 2009/0256945 A1   Oct. 15, 2009

(30) Foreign Application Priority Data

Apr. 11, 2008   (JP) ................................. 2008-103350

(51) Int. Cl.
*H04N 5/225*   (2006.01)
(52) U.S. Cl. .................... 348/373; 348/333.09
(58) Field of Classification Search ............. 348/333.09, 348/373
See application file for complete search history.

(56) References Cited

U.S. PATENT DOCUMENTS

| 2007/0058075 | A1* | 3/2007 | DeSorbo ....................... 348/373 |
| 2007/0229694 | A1* | 10/2007 | Oshima et al. ........... 348/333.06 |
| 2008/0198255 | A1* | 8/2008 | Kirihara et al. ............... 348/341 |
| 2008/0239142 | A1* | 10/2008 | Suzuki .......................... 348/376 |
| 2008/0252752 | A1* | 10/2008 | Kosaka .................... 348/231.99 |

FOREIGN PATENT DOCUMENTS

JP   2006-317911   11/2006

* cited by examiner

*Primary Examiner* — Gevell Selby
(74) *Attorney, Agent, or Firm* — Wenderoth, Lind & Ponack, L.L.P.

(57) ABSTRACT

A first video camera includes a lens barrel, a main frame, a first side panel, a second side panel, a first media insertion part, a viewfinder, a handle part, and a stay. The first media insertion part is fixed to the main frame. The viewfinder is disposed at the upper part of the media insertion part. The handle part protrudes from the viewfinder in a direction parallel to the optical axis of the lens barrel. The stay links the main frame and the handle part. The media insertion part is a separate member from the main frame, the first side panel, the second side panel, the viewfinder, and the handle part.

7 Claims, 4 Drawing Sheets

IMAGING DEVICE FOR A CAMERA

CROSS-REFERENCE TO RELATED APPLICATIONS

This application claims priority to Japanese Patent Application No. 2008-103350 filed on Apr. 11, 2008. The entire disclosure of Japanese Patent Application No. 2008-103350 is hereby incorporated herein by reference.

BACKGROUND OF THE INVENTION

I. Technical Field

The technical field relates to an imaging device such as a portable video camera.

II. Description of the Related Art

A conventional imaging device includes a main body part and a handle part. A media insertion part for inserting recording media is formed integrally with the main body part. The handle part is linked to the main body by a stay, and is formed integrally with the stay.

FIG. 4 is a diagram of the structure of a conventional imaging device. The media insertion part (not shown) is built into a main body part 41, and a stay is formed integrally with a handle part 44 (see, for example, Japanese Laid-Open Patent Application 2006-317911).

However, with this conventional imaging device, since the structure varies from model to model, the constituent parts are specialized and will only work with one model. Accordingly, if there is a difference in the configuration of the recording media or electronic circuitry, a new, specialized housing structure will be necessary, and investment has to be made in costly molds every time a new model is developed.

SUMMARY OF THE INVENTION

The technology described below provides an imaging device with which cost can be reduced.

An imaging device according to an aspect includes a lens barrel, a main frame, a first side panel, a second side panel, a media insertion part, a viewfinder, a handle part, and a stay. The main frame supports the lens barrel. The first side panel is provided to the side of the main frame. The second side panel is provided on the opposite side of the main frame from the first side panel. The media insertion part is fixed to the main frame. The viewfinder is disposed at the upper part of the media insertion part. The handle part protrudes from the viewfinder in a direction parallel to the optical axis of the lens barrel. The stay links the main frame and the handle part. The media insertion part is a separate member from the main frame, the first side panel, the second side panel, the viewfinder, and the handle part.

With this imaging device, since the media insertion part is a separate member from the main frame, the first side panel, the second side panel, the viewfinder, and the handle part, even if a different part is used as the media insertion part, the other parts can continue to be used.

Thus, with this imaging device, even if the recording medium is different, the cost of manufacturing a different media insertion part can be lowered, and this affords a cost reduction.

BRIEF DESCRIPTION OF THE DRAWINGS

Referring now to the attached drawings which form a part of this original disclosure.

DETAILED DESCRIPTION OF THE INVENTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Configuration of Video Camera

Figure 1:
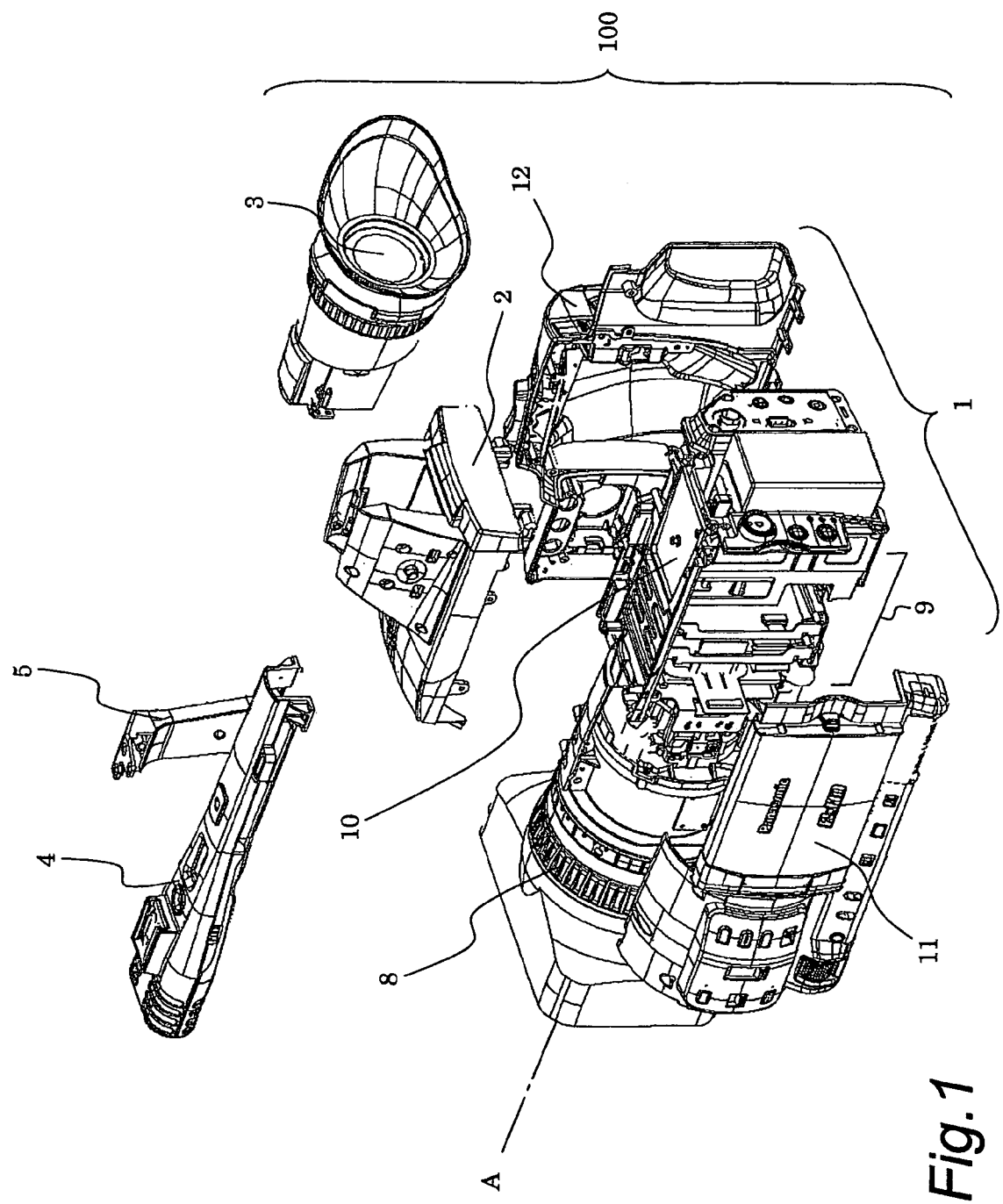
FIG. 1 is an exploded perspective view of a first video camera.

A first video camera 100 pertaining to an embodiment will be described through reference to FIGS. 1 and 2. FIG. 1 is an exploded perspective view of the first video camera 100, and FIG. 2 is a perspective view of the first video camera 100.

Figure 2:
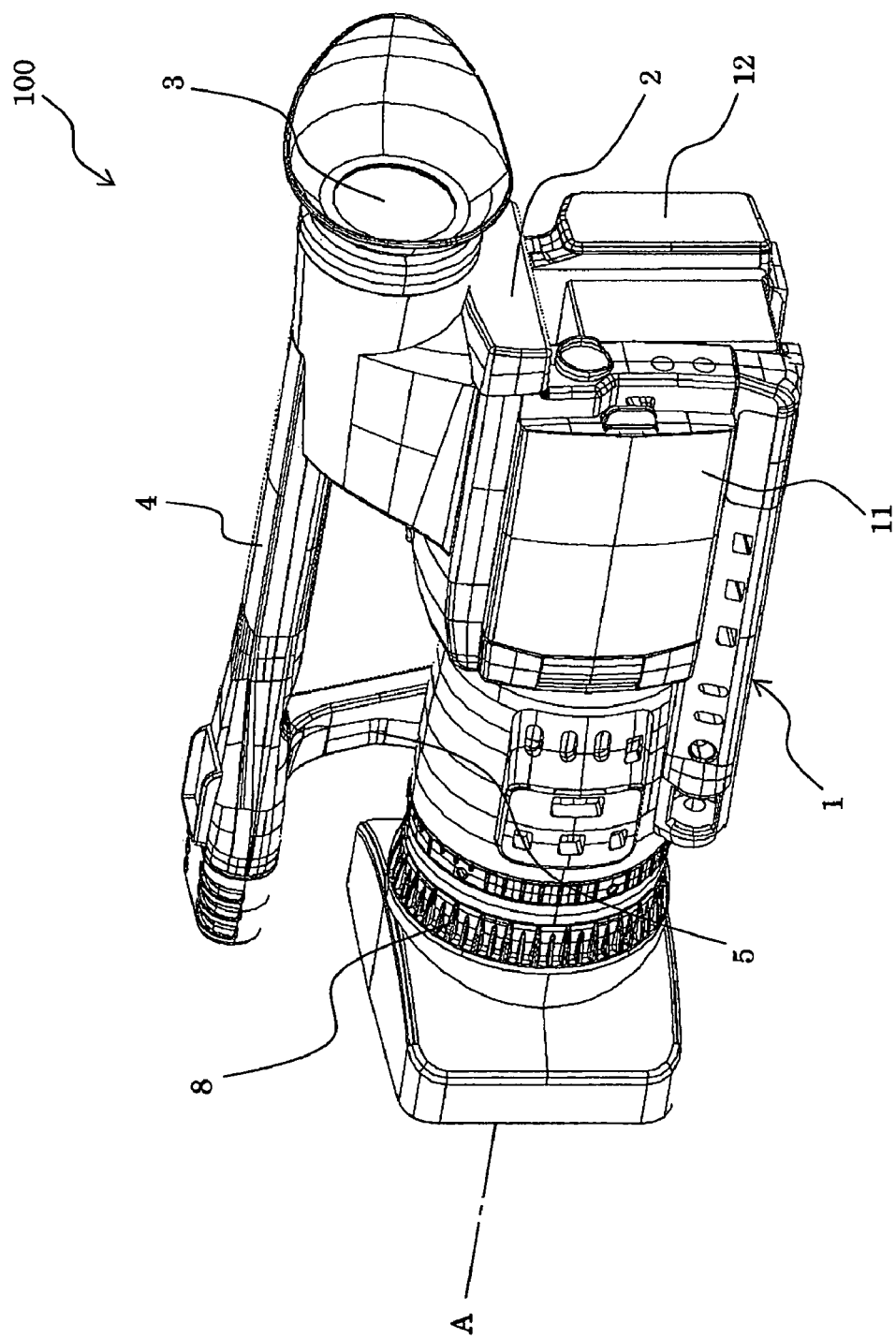
FIG. 2 is a perspective view of the first video camera.

As shown in FIGS. 1 and 2, the first video camera 100 (an example of the imaging device) includes a lens barrel 8, a circuit board group 9, a main frame 10, a first side panel 11, a second side panel 12, a first media insertion part 2 (an example of the media insertion part), a viewfinder 3, a handle part 4, and a first stay 5 (an example of the stay).

An optical system (not shown) having an optical axis A is installed in the lens barrel 8. The circuit board group 9 is provided with a plurality of circuit boards. The lens barrel 8 and the circuit board group 9 are fixed to the main frame 10. The lens barrel 8 is supported by the main frame 10.

The first side panel 11 is a member provided with a liquid crystal monitor, for example, and is provided to the side on the main frame 10 (the left side facing the subject side). The second side panel 12 is, for example, a member provided with a grip (not shown) for holding the first video camera 100, and is provided on the opposite side of the main frame 10 from the first side panel 11 (the right side facing the subject side). The lens barrel 8, the circuit board group 9, the main frame 10, the first side panel 11, and the second side panel 12 constitute a main body part 1.

The first media insertion part 2 is disposed at the upper part of the rear end of the main body part 1 (more precisely, the main frame 10). More specifically, the first media insertion part 2 is formed as a separate member from the main body part 1, and is fixed to the main body part 1.

The first media insertion part 2 is constituted alone as a single unit, and is linked to the main body part 1, the viewfinder 3, and the handle part 4. More specifically, the first media insertion part 2 is provided to the upper part of the main frame 10, and is disposed between the first side panel 11 and the second side panel 12. In a state in which the first side panel 11 and the second side panel 12 are fixed to the main body part 1, the first media insertion part 2 can be mounted to the main body part 1 from a direction other than the side (such as from the front, above, or below), or can be removed from the main body part 1 in a direction other than the side. The viewfinder 3 is fixed to the upper part of the first media insertion part 2.

The handle part 4 protrudes forward (toward the subject side) from the viewfinder 3 in a direction parallel to the optical axis A. The first stay 5 is provided to the front end of the handle part 4.

The first stay 5 is itself a single member, and is a separate member from the handle part 4 and the main body part 1. The first stay 5 links the main body part 1 and the handle part 4. The upper end of the first stay 5 is fixed to the handle part 4, and its lower end is fixed to the main body part 1. The first stay 5 can be said to be sandwiched between the main body part 1 (the main frame 10) and the front end of the handle part 4.

The upper end of the first stay 5 is fixed with a plurality of screws (not shown) to the side of the handle part 4. The first stay 5 is disposed at a position that is offset to the side from the handle part 4 (more specifically, the second side panel 12 side with respect to the handle part 4). The screws are locked with an adhesive, for example.

Since the first media insertion part 2 and the first stay 5 are separate from their surrounding members, even if the model is different, the other parts can continue to be used by changing the first stay 5 in the event that the size of the first media insertion part 2 is different.

Figure 3:
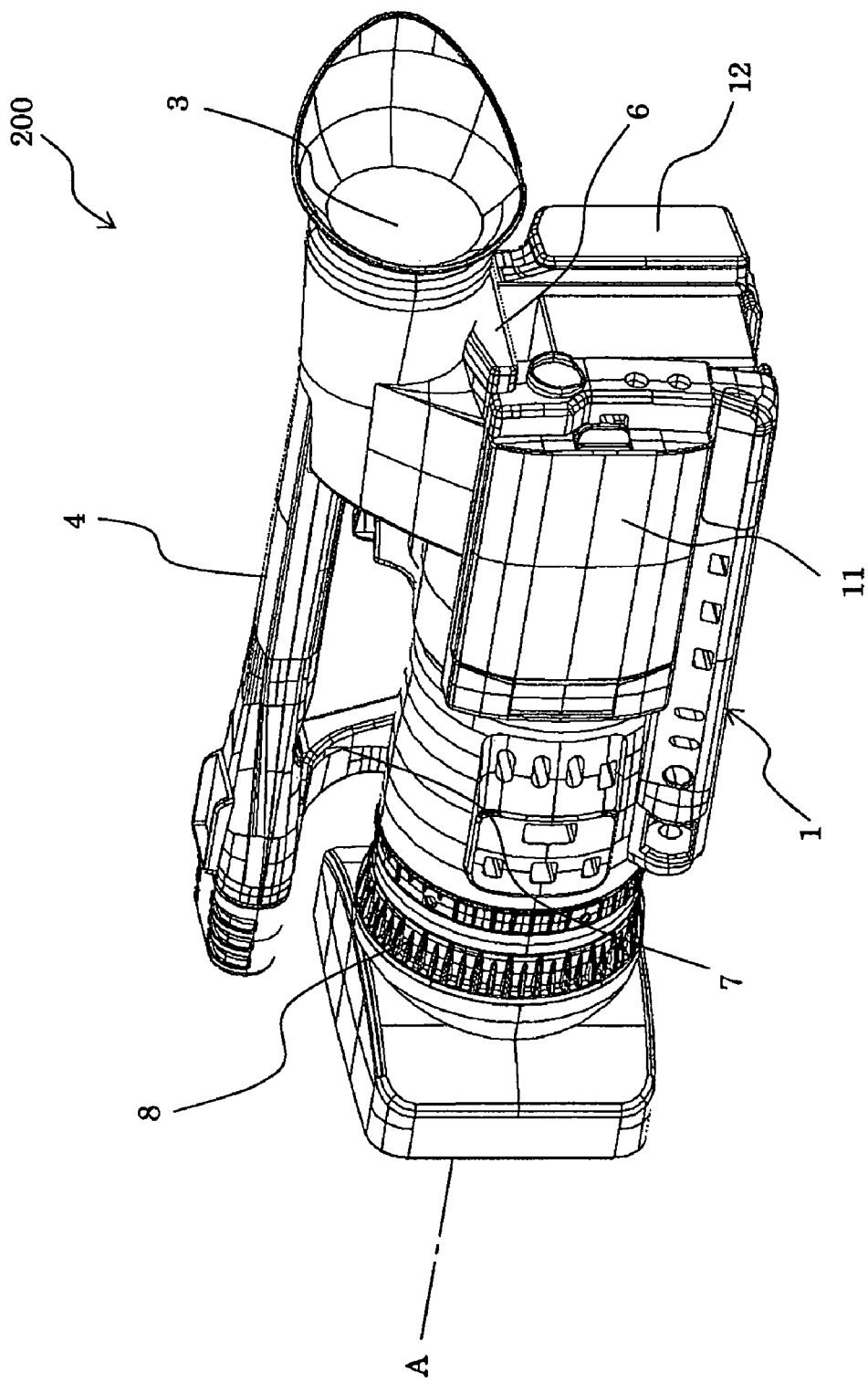
FIG. 3 is a perspective view of a second video camera.
Figure 4:
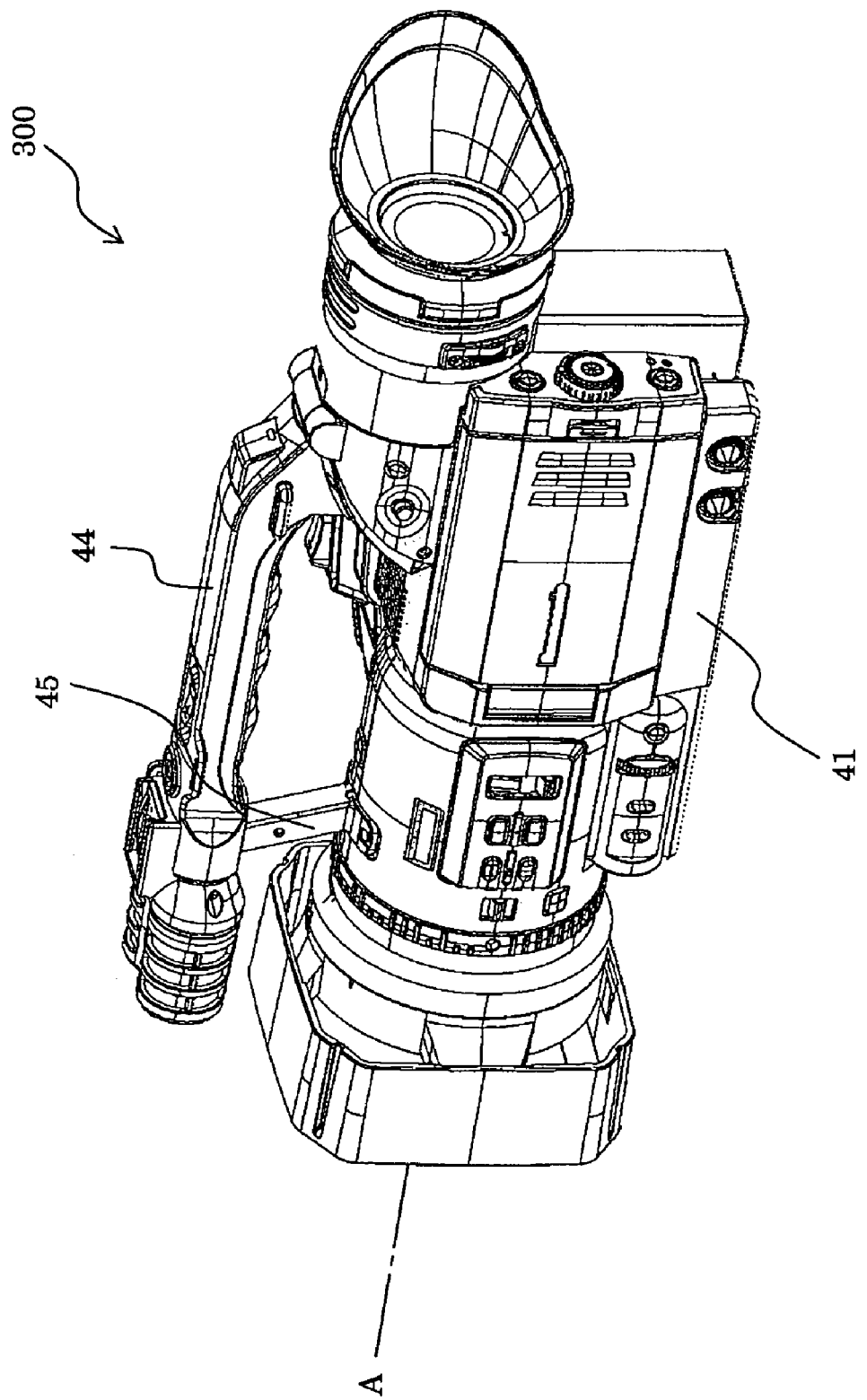
FIG. 4 is a perspective view of a conventional video camera.

For instance, as with the second video camera 200 (an example of the imaging device) shown in FIG. 3, a second media insertion part 6 (an example of the media insertion part) is disposed instead of the first media insertion part 2 at the upper part of the rear end of the main body part 1. The second media insertion part 6 allows the insertion of media smaller than the media used in the first media insertion part 2. Accordingly, the size of the second media insertion part 6 in the vertical direction is smaller than the size of the first media insertion part 2 in the vertical direction.

A viewfinder 3 that is the same as the one used with the first video camera 100 is fixed to the upper part of the second media insertion part 6. A handle part 4 that is the same as the one used with the first video camera 100 is fixed to the viewfinder 3. Since the second media insertion part 6 is lower in height than the first media insertion part 2, a second stay 7 (an example of the stay) that is lower in height than the first stay 5 is used to link the handle part 4 and the main body part 1.

Features of Video Camera (1) With this first video camera 100, since the first media insertion part 2 is separate from the main frame 10, the first side panel 11, the second side panel 12, the viewfinder 3, and the handle part 4, even if the first media insertion part 2 is changed to the second media insertion part 6, which has different specifications, the other members (the viewfinder 3, the main body part 1, the lens barrel 8, etc.) can continue to be used. Consequently, the manufacturing cost can be reduced even when employing a media insertion part with different specifications.

(2) With this first video camera 100, since the first stay 5 is separate from the handle part 4, if the first stay 5 is also changed along with the first media insertion part 2, then the handle part 4 can also continue to be used, which further reduces the manufacturing cost.

(3) Since the first stay 5 is disposed at a position that is offset to the side from the handle part 4, when a zoom ring on the lens barrel 8 is operated, for example, the user can move the ring by hand over a wider range, making it easier to operate.

Other Embodiments

Embodiments of the present invention are not limited to the embodiment given above, and various modifications and changes are possible without departing from the gist of the present invention. Also, the embodiment given above is basically just favorable example, and is not intended to limit the present invention, its applications, or the scope of these applications.

(A) With the above embodiment, the first side panel 11 and the second side panel 12 are separate members, but the first side panel 11 and the second side panel 12 may instead be formed integrally. In this case, for example, part of the first side panel 11 and second side panel 12 is disposed above the main body part 1.

(B) In the above embodiment, the first media insertion part 2 and the second media insertion part 6 are disposed between the upper end of the first side panel 11 and the upper end of the second side panel 12, but first media insertion part 2 and the second media insertion part 6 may instead be disposed at the upper part of the first side panel 11 and the second side panel 12. For example, if the first side panel 11 and the second side panel 12 are integral members, then a configuration is possible in which the first media insertion part 2 and the second media insertion part 6 are disposed at the upper part of the first side panel 11 and the second side panel 12.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An imaging device, comprising:
a lens barrel;
a main frame supporting said lens barrel, and having an upper part, a first side and a second side opposite said first side;
a first side panel disposed on said first side of said main frame;
a second side panel disposed on said second side of said main frame;
a media insertion part having an upper part, and being disposed between said first and second side panels and being arranged on said upper part of said main frame;
a viewfinder disposed at said upper part of said media insertion part;
a handle part protruding from said viewfinder in a direction parallel to the optical axis of said lens barrel; and
a stay linking said main frame and said handle part,
wherein said media insertion part is a separate member from said main frame, said first side panel, said second side panel, said viewfinder, and said handle part.

2. The imaging device according to claim 1,
wherein said stay is a separate member from the handle part.

3. The imaging device according to claim 2,
wherein said stay is disposed at a position that is offset to a side of said handle part.

4. The imaging device according to claim 1,
wherein said stay is disposed at a position that is offset to a side of said handle part.

5. The imaging device according to claim 1, wherein said viewfinder is coupled to said media insertion part.

6. The imaging device according to claim 1, wherein said handle part is coupled to said media insertion part.

7. The imaging device according to claim 1, wherein said media insertion part is coupled to a rear part of said upper part of said main frame.

* * * * *